United States Patent
Li et al.

(10) Patent No.: US 11,574,415 B2
(45) Date of Patent: Feb. 7, 2023

(54) METHOD AND APPARATUS FOR DETERMINING AN ICON POSITION

(71) Applicant: Beijing Dajia Internet Information Technology Co., Ltd., Beijing (CN)

(72) Inventors: Mading Li, Beijing (CN); Yunfei Zheng, Beijing (CN); Jiajie Zhang, Beijing (CN); Xiaodong Ning, Beijing (CN); Yuyan Song, Beijing (CN); Bing Yu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/532,349

(22) Filed: Nov. 22, 2021

(65) Prior Publication Data

US 2022/0084237 A1    Mar. 17, 2022

Related U.S. Application Data

(63) Continuation of application No. PCT/CN2020/078679, filed on Mar. 10, 2020.

(30) Foreign Application Priority Data

May 22, 2019   (CN) .......................... 201910430924.8

(51) Int. Cl.
*G06T 9/00*      (2006.01)
*G06T 7/70*      (2017.01)
(Continued)

(52) U.S. Cl.
CPC ................ *G06T 7/70* (2017.01); *G06V 10/22* (2022.01); *G06V 10/24* (2022.01); *G06V 10/70* (2022.01);
(Continued)

(58) Field of Classification Search
CPC ........... G06T 1/0021; G06T 7/60; G06T 7/62; G06T 7/66; G06T 7/70; G06T 11/60;
(Continued)

(56) References Cited

U.S. PATENT DOCUMENTS 8,359,541 B1    1/2013   Landry
9,467,750 B2 *  10/2016  Banica ............... H04N 21/4316
(Continued)

FOREIGN PATENT DOCUMENTS

CN      1514409 A       7/2004
CN      102830890 A     12/2012
(Continued)

OTHER PUBLICATIONS

English Translation of First Office Action issued in CN 201910430924. 8, dated Jun. 29, 2020.
(Continued)

*Primary Examiner* — Eric Rush
(74) *Attorney, Agent, or Firm* — Meunier Carlin & Curfman LLC

(57) ABSTRACT

Disclosed are a method and device for determining an icon position. The method includes: detecting a target object in a target image and determining the reference position of the target object in the target image, and detecting a salient position in the target image, thereby obtaining the reference position of a key target or object in the target image, and a salient position possibly requiring more attention in the target image; and selecting, according to the distance between the reference position or salient position and preset candidate positions, an icon position from the candidate positions.

18 Claims, 6 Drawing Sheets

(51) Int. Cl.
*G06V 10/24* (2022.01)
*G06V 10/22* (2022.01)
*G06V 20/00* (2022.01)
*H04N 21/431* (2011.01)
*G06V 10/70* (2022.01)
*H04N 5/445* (2011.01)
*H04N 21/488* (2011.01)
*G06V 30/14* (2022.01)

(52) U.S. Cl.
CPC .......... *G06V 20/00* (2022.01); *G06V 30/1444* (2022.01); *H04N 5/445* (2013.01); *H04N 5/44504* (2013.01); *H04N 21/4316* (2013.01); *H04N 21/4884* (2013.01)

(58) Field of Classification Search
CPC ...... G06V 10/22; G06V 10/24; G06V 10/245; G06V 10/25; G06V 10/462; G06V 10/464; G06V 10/70; G06V 10/751; G06V 10/764; G06V 10/765; G06V 10/80; G06V 10/803; G06V 20/00; G06V 20/20; G06V 30/1444; G06F 3/0481; G06F 3/04817; G06F 3/0484; G06F 3/04842; G06F 3/04845; H04N 5/445; H04N 5/44504; H04N 5/45; H04N 21/4312; H04N 21/4314; H04N 21/4316; H04N 21/47205; H04N 21/4882; H04N 21/4884; H04N 21/4886; H04N 21/4888; H04N 2201/3245; G09G 2340/12; G09G 2340/14
USPC ....... 382/100, 103, 154, 173, 181, 195, 209, 382/215–218, 224, 226, 229, 276, 282, 382/286–288, 291, 292, 294, 295, 307, 382/308, 325; 348/135, 169, 171, 172, 348/222.1, 231.3, 231.5, 239, 254, 348/333.02, 465, 468, 473, 474, 576, 589, 348/600, 601, 671; 345/595, 619, 620, 345/625–629, 632–638, 641, 156; 715/243–246, 253, 255, 256, 705, 706, 715/764–766, 788, 790, 798, 799, 817
See application file for complete search history.

(56) References Cited

U.S. PATENT DOCUMENTS

| | | | |
|---|---|---|---|
| 9,959,652 B2* | 5/2018 | Ma .......................... | H04N 5/445 |
| 10,146,413 B2* | 12/2018 | Choi ....................... | G06T 11/60 |
| 10,558,322 B2* | 2/2020 | Kim ....................... | G06V 10/273 |
| 10,645,332 B2* | 5/2020 | Zhang ..................... | G06V 20/46 |
| 2009/0273711 A1* | 11/2009 | Chapdelaine .......... | G06V 20/40 |
| | | | 382/176 |
| 2011/0321084 A1* | 12/2011 | Takahashi ............ | H04N 5/2723 |
| | | | 725/32 |
| 2014/0105410 A1 | 4/2014 | Zhan | |
| 2014/0105450 A1 | 4/2014 | Berkeley et al. | |
| 2014/0156364 A1* | 6/2014 | Zalewski ................ | G06K 9/62 |
| | | | 382/181 |
| 2015/0193630 A1 | 7/2015 | Von Kaenel et al. | |
| 2022/0245823 A1* | 8/2022 | Su ........................ | G06V 10/462 |

FOREIGN PATENT DOCUMENTS

| | | |
|---|---|---|
| CN | 102890814 A | 1/2013 |
| CN | 107885565 A | 4/2018 |
| CN | 108008878 A | 5/2018 |
| CN | 108391078 A | 8/2018 |
| CN | 108550101 A | 9/2018 |
| CN | 108596820 A | 9/2018 |
| CN | 109445653 A | 3/2019 |
| CN | 109471571 A | 3/2019 |
| CN | 110286813 A | 9/2019 |
| EP | 2592539 A2 | 5/2013 |
| EP | 3032391 A1 | 5/2013 |

OTHER PUBLICATIONS

English Abstract of "Research on the Best Embedding Position of Watermark Based on Wavelet Domain," Science and Technology Innovation Herald, No. 16, 2013, 2 pages.

Nah et al., A New Image Watermarking using Peak Position Modulation for ID Photos, 2009 11th IEEE International Symposium on Multimedia, pp. 595-599.

International Search Report issued in PCT/CN2020/078679, dated Jun. 3, 2020.

\* cited by examiner

METHOD AND APPARATUS FOR DETERMINING AN ICON POSITION

CROSS-REFERENCE OF RELATED APPLICATIONS

The disclosure is the continuation application of International Application No. PCT/CN2020/078679, filed on Mar. 10, 2020, which is based upon and claims the priority from Chinese Patent Application No. 201910430924.8, filed with the China National Intellectual Property Administration on May 22, 2019, which is hereby incorporated by reference in its entirety.

TECHNICAL FIELD

The disclosure relates to the field of image processing technology, and in particular to a method and apparatus for determining an icon position.

BACKGROUND

At present, the icons such as title text and watermark in an image or a video are generally placed in the middle, top or bottom of the image or video frame image. The inventors found that these icons may overlay key objects in the image, affect the display effect of the image, and cause interference to the users watching the picture in many cases.

SUMMARY

This disclosure provides a method and apparatus for determining an icon position.

According to a first aspect of embodiments of the disclosure, a method for determining an icon position is provided. The method includes: detecting a target object in a target image and determining a reference position of the target object in the target image; detecting a salient location in the target image; and selecting an icon position from preset candidate positions according to distances between the reference position or the salient location and the candidate positions.

According to a second aspect of embodiments of the disclosure, an apparatus for determining an icon position is provided. The apparatus includes: a reference position determination module configured to detect a target object in a target image and determine a reference position of the target object in the target image; a salient location detection module configured to detect a salient location in the target image; and a position selection module configured to select an icon position from preset candidate positions according to distances between the reference position or the salient location and the candidate positions.

According to a third aspect of embodiments of the disclosure, an electronic device is provided. The electronic device includes: a processor; and a memory for storing instructions that can be executed by the processor; wherein the processor is configured to execute the instructions to implement the method for determining an icon position as described in the first aspect.

According to a fourth aspect of embodiments of the disclosure, a readable storage medium is provided. When the instructions in the storage medium are executed by a processor of an electronic device, the electronic device can perform the method for determining an icon position as described in the first aspect.

According to a fifth aspect of embodiments of the disclosure, a computer program product is provided. When the instructions in the computer program product are executed by a processor of an electronic device, the electronic device can perform the method for determining an icon position as described in the first aspect.

It should be understood that the above general description and the following detailed description are only exemplary and illustrative, and cannot limit the disclosure.

BRIEF DESCRIPTION OF THE DRAWINGS

The accompanying drawings here are incorporated into and constitute a part of the specification, illustrate the embodiments conforming to the disclosure, and serve to explain the principles of the disclosure together with the specification but not constitute an improper limitation on the disclosure.

DETAILED DESCRIPTION

In order to enable those ordinary skilled in the art to better understand the technical solutions of the disclosure, the technical solutions in the embodiments of the disclosure will be described clearly and completely with reference to the accompanying drawings.

It should be noted that the terms such as "first", "second" and the like in the specification and claims of the disclosure and the above drawings are used to distinguish the similar objects, but not necessarily to describe a particular order or sequence. It should be understood that the data used in this way is interchangeable under appropriate circumstances, so that the embodiments of the disclosure described herein can be implemented in an order other than those illustrated or described herein. The implementation modes described in the following exemplary embodiments do not represent all the implementation modes consistent with the disclosure. On the contrary, they are only the examples of the devices and methods which are detailed in the attached claims and consistent with some aspects of the disclosure.

Figure 1:
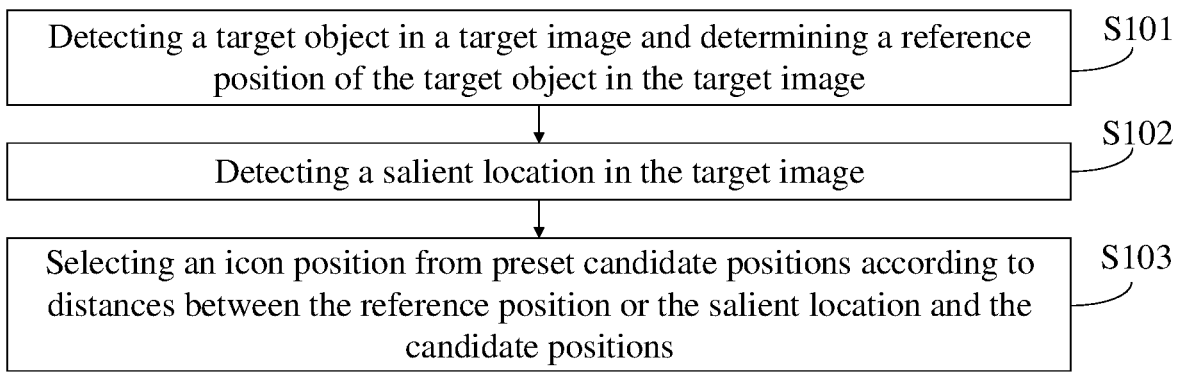
FIG. 1 illustrates a flowchart of a method for determining an icon position according to some embodiments.

FIG. 1 is a flowchart of a method for determining an icon position according to some embodiments. This method may be applied to an electronic device. As shown in FIG. 1, the method for determining an icon position includes the following steps S101-S103.

S101: detecting a target object in a target image and determining a reference position of the target object in the target image.

S102: detecting a salient location in the target image.

S103: selecting an icon position from preset candidate positions according to distances between the reference position or the salient location and the candidate positions.

In some embodiments, the target image refers to an image to be added with an icon. The target image may include a video image, a static image, etc., and the icon to be added to the target image may include an opaque or a semi-transparent mark such as caption text, floating image, watermark, etc. A target object is generally included in the target image, and the target object may be any object, such as human, animal, article, plant, etc., included in the image. In some embodiments, the target object in the target image may be detected by using the Faster Regions with Convolutional Neural Networks features (Faster-RCNN) algorithm, Single Shot MultiBox Detector (SSD) algorithm, etc., and embodiments of the disclosure do not specifically limit the detection method. After the detection is completed, zero, one or more rectangular boxes are generally output according to the detection result, so as to frame the target object. The center position of the rectangular box or the position corresponding to a certain feature of the object in the rectangular box is selected as the reference position of the target object.

In some embodiments, the saliency detection can be performed on the target image. The saliency detection is a technology that calculates the saliency of an image by analyzing the characteristics such as color, intensity and direction of the image to generate a saliency map. The salient point of an image refers to a pixel (or region) in the image which can be distinguished from other pixels (or regions) to attract the visual attention. For example, if there is a black spot on a piece of white paper, the saliency of the black spot is higher, and the saliency is lower in other places. The saliency map is a two-dimensional image with the same size as the original image, wherein the value of each pixel represents the magnitude of the saliency of the corresponding point of the original image. The saliency map may be used to guide the selection of the attention area and quickly locate the saliency area of the image. The saliency detection may be performed on the target image by using the Minimum Barrier Salient (MBS) algorithm.

In some embodiments, the preset candidate position is a predetermined floating position of the icon on the target image, and there are generally multiple candidate positions. For example, the candidate positions may include the center, upper center, lower center, left center, right center, upper left corner, upper right corner, lower left corner, and lower right corner of the target image. The Euclidean distances between each reference position obtained in S101 and the candidate positions are calculated, the Euclidean distances between the salient location obtained in S102 and the candidate positions are calculated, and one or more candidate positions are selected as the icon position based on these distances.

Specifically, in order to prevent the icon from occluding key objects in the image, the candidate position with the largest Euclidean distance may be selected as the icon placement position.

In the embodiments of the disclosure, the target object in the target image is detected and the reference position of the target object in the target image is determined, and the salient location in the target image is detected, so as to obtain the reference position of the more significant object or article in the target image and the salient location that may be paid more attention in the target image. Finally the icon position is selected from preset candidate positions according to the distances between the reference position or the salient location and the candidate positions, so as to prevent the icon from occupying the reference position and the salient location. This method does not require the manual operation at all and has the higher efficiency.

Figure 2:
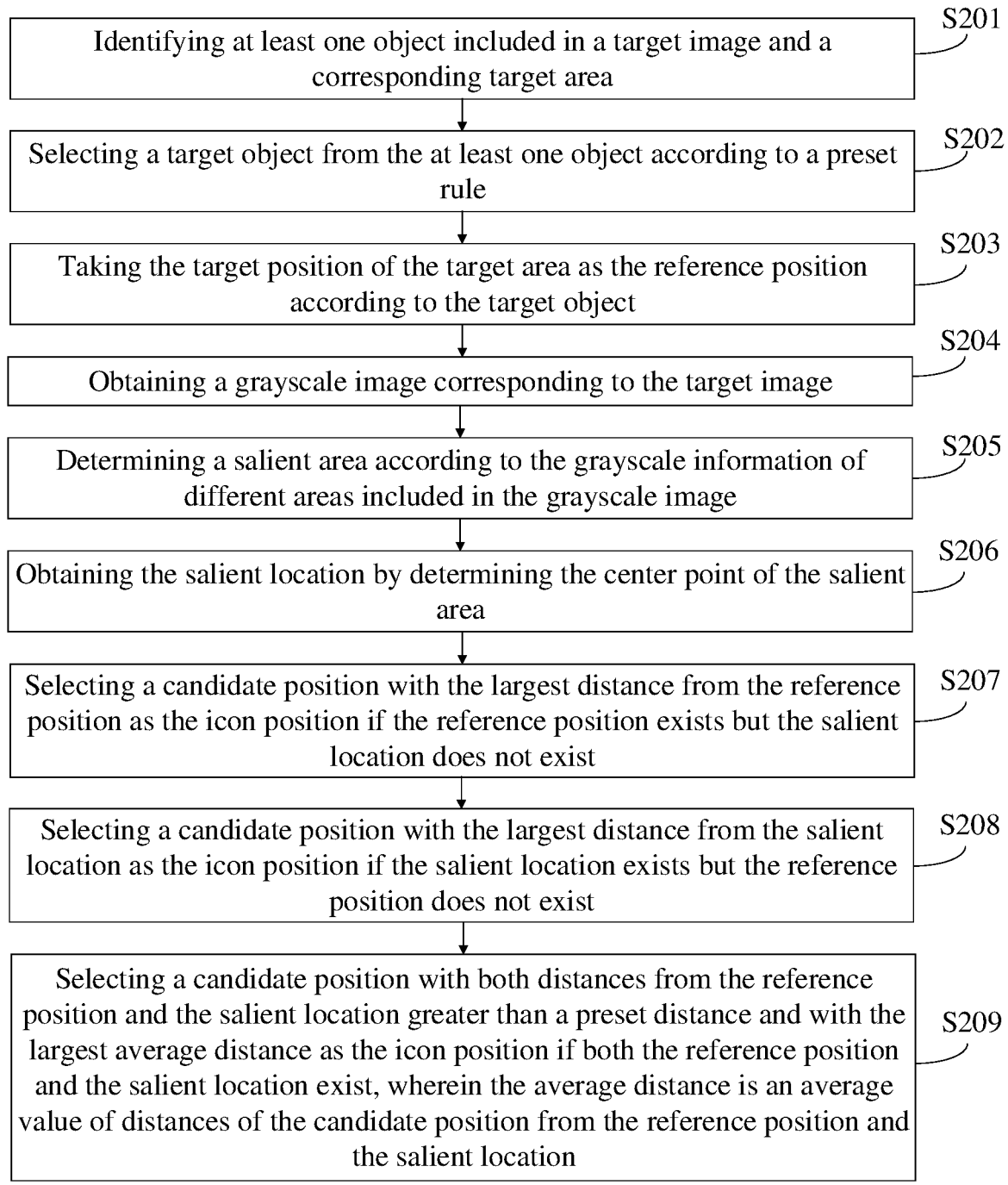
FIG. 2 illustrates a flowchart of another method for determining an icon position according to some embodiments.

FIG. 2 is a flowchart of another method for determining an icon position according to some embodiments, which is an optional embodiment of the method in FIG. 1. As shown in FIG. 2, the method for determining an icon position includes the following steps S201-S209.

S201: identifying at least one object in a target image and a corresponding target area.

In some embodiments, the objects in the target image are firstly identified. For example, the face detection, cat and dog detection, article detection, and even more refined facial feature point detection are performed on the target image. Zero, one or more rectangular boxes are generally output according to the detection results. The rectangular box is the target area and is used to frame the target object.

Figure 3:
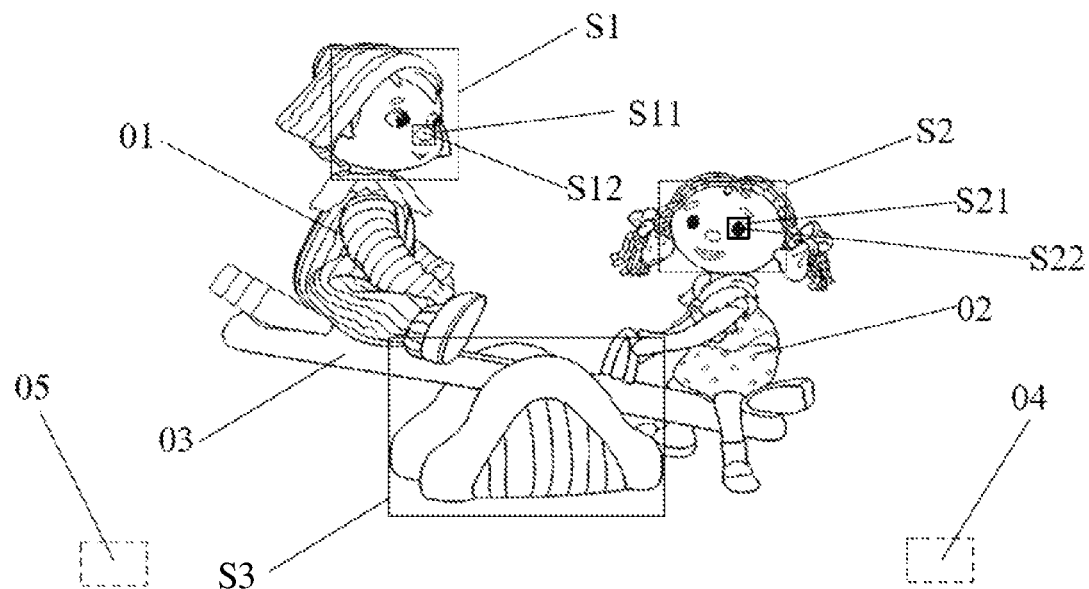
FIG. 3 illustrates a schematic diagram describing the determination of the icon position in a target image according to some embodiments.

FIG. 3 is a schematic diagram of determining the icon position in a target image according to some embodiments. A little boy 01, a little girl 02, and a seesaw 03 are in FIG. 3. Through the image detection, three objects in the target image are identified: little boy 01, little girl 02 and seesaw 03; and three corresponding target areas are output: the target area S1 corresponding to the face of the little boy 01, the target area S2 corresponding to the face of the little girl 02, and the target area S3 corresponding to the fulcrum of the seesaw 03.

S202: selecting a target object from the at least one object according to a preset rule.

In some embodiments, the most critical object is selected from at least one object identified in the target image according to the preset rule. For example, it is possible to select the largest object, or one of several closest objects, or the smallest object, etc.

In some embodiments, in a method for determining an icon position, said selecting a target object from the at least one object according to a preset rule may include the following step A1 or step A2.

A1: determining the target object according to a position/positions of the at least one object in the target image.

Specifically, the location area of each object in the target image is determined, and the target object is determined according to the location area. For example, the location areas are divided into the center, upper center, lower center, left center, right center, upper left corner, upper right corner, lower left corner, lower right corner, etc., and then an object in a certain location area is determined as the target object. For example, the little boy 01 located in the upper center may be determined as the target object in FIG. 3.

A2: determining the target object according to the area proportion of the at least one object in the target image.

Specifically, the target object may be determined according to the area proportion of the target area corresponding to each object. For example, the object with the maximum area proportion or the object with the minimum area proportion may be determined as the target object. For example, the seesaw 03 of which the target area has the maximum area proportion may be taken as the target object.

S203: taking a target position of a target area corresponding to the target object as the reference position, wherein the target position comprises: a center of the target area corresponding to the target object, and a position of a target feature in the target area corresponding to the target object.

In some embodiments, after the target object is determined, the target position may be selected as the reference position from the target area corresponding to the target object according to a preset rule. The preset rule may be to select the center of the target area as the reference position, or to select another specific position of the target area as the reference position. Alternatively, the preset rule may be to select the position of a target feature in the target area, for example, to select the position of the human eye or the position of the human nose or the like in the target area. Here, the specific element included in the target feature is not specifically limited in the embodiments of the disclosure, and can be preset by those skilled in the art according to requirements.

For example, in FIG. 3, after the target object is determined as the little boy 01, the position S11 of the human nose in S1 is selected as the reference position for the target area S1 corresponding to the little boy 01.

In some embodiments, the target area where the object in the target image is located is identified, and the target position is selected at the center of the target area or the position of the target feature. The target position is the position of the key part of the target object. For the subsequent selection of the icon position, the above target position can be omitted.

S204: obtaining a grayscale image corresponding to the target image.

In some embodiments, if the reference position of the target image does not exist, the salient location of the target image may be obtained. To obtain the salient location, the grayscale image corresponding to the target image may be firstly obtained. The grayscale image is one in which the value of each pixel is a single sample representing only an amount of light, where the contrast ranges from black at the weakest intensity to white at the strongest. The grayscale image is different from the black and white image, and the grayscale image has many shades of gray between black and white. The grayscale image may be obtained by measuring the brightness of each pixel in the target image in a single electromagnetic wave spectrum such as visible light.

The purpose of obtaining the grayscale image corresponding to the target image is to perform the saliency detection on the target image, but it is generally believed that the target object in the image is more important than the saliency area in the image. Thus, if the reference position is detected, there is no need to perform the saliency detection, that is, there is no need to perform the step S204 to step S206 in the embodiment of the disclosure.

S205: determining a salient area according to the grayscale information of different areas in the grayscale image.

The grayscale image includes a plurality of grayscale areas, and each area has the corresponding grayscale information which represents the shades of gray in this area. The salient area in the grayscale image may be determined according to the grayscale information corresponding to each area. The salient point of an image refers to a pixel (or region) in the image which can be distinguished from other pixels (or regions) to attract the visual attention. Therefore, the area in the grayscale image with the grayscale value being most different from that of other areas may be determined as the salient area. For example, if the grayscale value of the area S21 where the right eye of the little girl 02 is located has the largest difference from the grayscale values of other areas in the grayscale image after the FIG. 3 is converted into a grayscale image, then the area S21 is determined as the salient area.

S206: Obtaining the salient location by determining the center of the salient area.

After the salient area is determined, the center of the salient area is selected as the salient location.

For example, the center S22 of the area S21 may be determined as the salient location in FIG. 3.

Since the salient location is a position in the image that can attract more visual attention, the subsequent selection of the icon position can omit the salient location, to avoid the influence of the icon on the user's visual attention area in the target image.

S207: selecting a candidate position with the largest distance from the reference position as the icon position if the reference position exists but the salient location does not exist.

In some embodiments, if the target object in the target image is detected and the reference position of the target object is determined but the salient location of the target image does not exist because the grayscale information of the target image has little difference, then the candidate position farthest from the reference position is selected as the floating position of the icon. Here the candidate positions may include the center, upper center, lower center, left center, right center, upper left corner, upper right corner, lower left corner, and lower right corner of the target image. The above distance may be Euclidean distance, i.e., the distance between the center of the reference position and the center of the candidate position.

For example, in FIG. 3, if the salient location does not exist and the position S11 of the nose of the little boy S1 is the reference position, then the Euclidean distance between the center S12 of the reference position and the center of each candidate position is calculated. Through the calculation, the Euclidean distance between point S12 and the candidate position of the lower right corner 04 is the largest, so the candidate position at the lower right corner 04 is selected as the icon position.

S208: selecting a candidate position with the largest distance from the salient location as the icon position if the salient location exists but the reference position does not exist.

In some embodiments, if no object can be detected in the target image, it means that the target image has no reference position. While the grayscale image corresponding to the target image has a salient location, then the candidate position with the largest distance from the salient location is selected as the icon position. Specifically, the distance between the center of the salient location and the center of each candidate position is calculated.

For example, in FIG. 3, if the reference position does not exist and the center S22 of the position S21 corresponding to the eyes of the little girl S2 is the salient location, then the Euclidean distance between the point S22 and the center of each candidate position is calculated. Through the calculation, the Euclidean distance between point S22 and the candidate position at the lower left corner 05 is the largest, then the candidate position at the lower left corner 05 is selected as the icon position.

S209: selecting a candidate position with both distances from the reference position and the salient location greater than a preset distance threshold and with the largest average distance as the icon position if both the reference position and the salient location exist, wherein the average distance is an average of the distances between the candidate position and the reference position and the distance between the candidate position and the salient location.

In some embodiments, if both the reference position and the salient location exist, then the first distance between the reference position and each candidate position and the second distance between the salient location and each candidate position may be calculated respectively. At least one candidate position with both the first distance and the second distance greater than the preset distance threshold are obtained. For at least one such candidate position, the average of the first distance and the second distance is calculated to obtain at least one average distance, and the candidate position with the largest average distance is taken as the icon position.

Moreover, if both the reference position and the salient location exist, one of them may also be selected for determining the icon position according to the actual disclosure. For example, the candidate position with the largest distance from the reference position is selected as the icon position, or the candidate position with the largest distance from the salient location is selected as the icon position.

In the above steps 208 to 209, the candidate position with the largest distance from the reference position or with the largest distance from the salient location or with the largest average distance is selected as the icon position, so that the floating position of the icon is far away from the area where the key object in the target image is located, avoiding the influence of the icon on the picture display effect.

In addition to the beneficial effects of the method for determining an icon position in FIG. 1, embodiments of the disclosure also identifies the target area where an object in the target image is located and selects the target position at the center of the target area or the position of the target feature, where the target position is the position of the key part of the target object. Meanwhile, the salient location is determined according to the grayscale image corresponding to the target image, where the salient location is the position in the target image that can attract more visual attention. The candidate position with the largest distance from the reference position or with the largest distance from the salient location or with the largest average distance from the reference position and the salient location is selected as the icon position, so that the floating position of the icon is set far away from the area where the key object in the target image is located, avoiding the influence of the icon on the picture display effect. This solution determines the floating position of the icon without manual operation in the case of fully considering the reference position and the salient location of the target image, and the selected position is more accurate.

Figure 4:
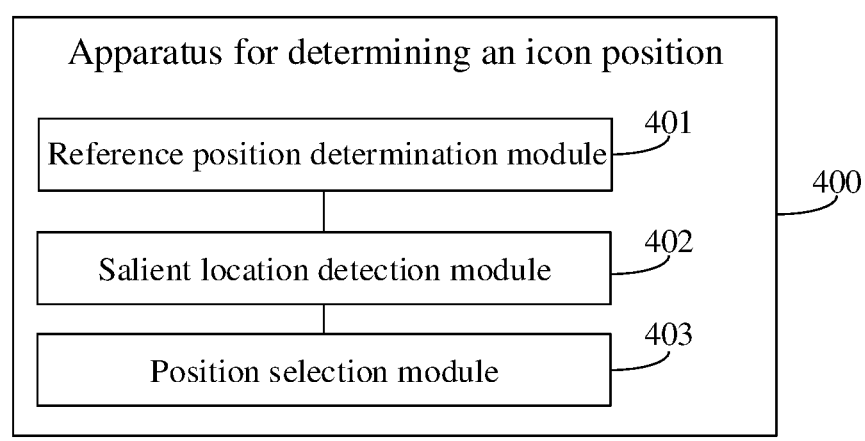
FIG. 4 illustrates is a block diagram of an apparatus for determining an icon position according to some embodiments.

FIG. 4 is a block diagram of an apparatus for determining an icon position according to some embodiments. Referring to FIG. 4, the apparatus for determining an icon position 400 includes:
a reference position determination module 401 configured to detect a target object in a target image and determine a reference position of the target object in the target image;
a salient location detection module 402 configured to detect a salient location in the target image;
a position selection module 403 configured to select an icon position from preset candidate positions according to distances between the reference position or the salient location and the candidate positions.

Regarding the apparatus for determining an icon position 400 in the above embodiment, the specific manner in which each module performs the operations has been described in detail in the embodiment related to the method, and will not be illustrated in detail here.

Figure 5:
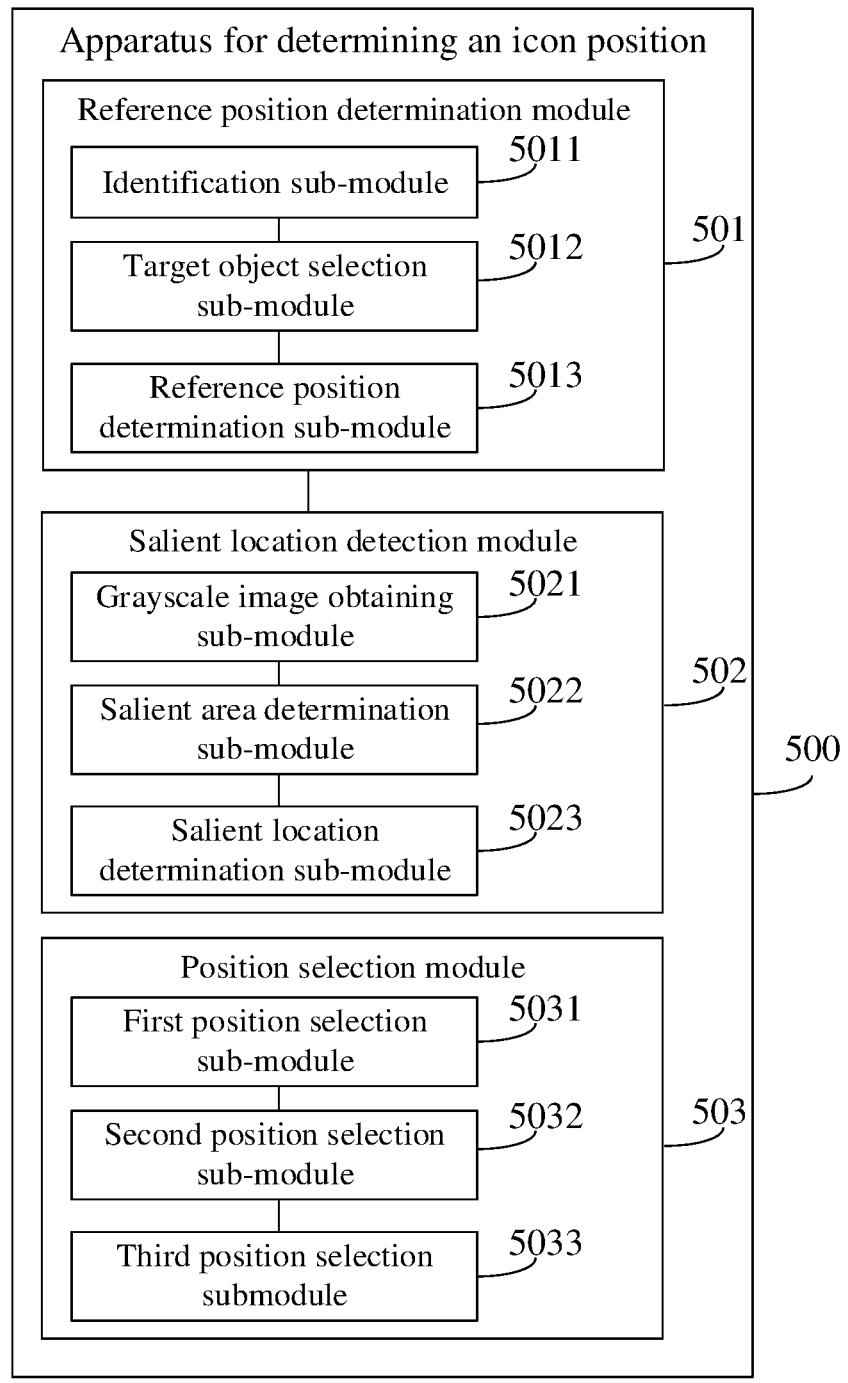
FIG. 5 illustrates a block diagram of another apparatus for determining an icon position according to some embodiments.

FIG. 5 is a block diagram of another apparatus for determining an icon position according to some embodiments. Referring to FIG. 5, the apparatus for determining an icon position 500 includes:
a reference position determination module 501 configured to detect a target object in a target image and determine a reference position of the target object in the target image;
wherein the reference position determination module 501 includes:
an identification sub-module 5011 configured to identify at least one object in the target image and a corresponding target area;
a target object selection sub-module 5012 configured to select a target object from the at least one object according to a preset rule; and
a reference position determination sub-module 5013 configured to take a target position of a target area corresponding to the target object as the reference position, wherein the target position comprises: a center of the target area corresponding to the target object, and a position of a target feature in the target area corresponding to the target object;
wherein the target object selection sub-module 5012 includes: a first determining unit configured to determine the target object according to a position/positions of the at least one object in the target image; or a second determining unit configured to determine the target object according to an area proportion of the at least one object in the target image;
a salient location detection module 502 configured to detect a salient location in the target image;
wherein the salient location detection module 502 includes:
a grayscale image obtaining sub-module 5021 configured to obtain a grayscale image corresponding to the target image;
a salient area determination sub-module 5022 configured to determine a salient area according to the grayscale information of different areas in the grayscale image; and
a salient location determination sub-module 5023 configured to obtain the salient location by determining a center of the salient area;
a position selection module 503 configured to select an icon position from preset candidate positions according to distances between the reference position or the salient location and the candidate positions;
wherein the position selection module 503 includes:
a first position selection sub-module 5031 configured to select a candidate position with a largest distance from the reference position as the icon position if the reference position exists but the salient location does not exist;
a second position selection sub-module 5032 configured to select a candidate position with a largest distance from the salient location as the icon position if the salient location exists but the reference position does not exist; and
a third position selection sub-module 5033 configured to select a candidate position with both distances from the reference position and the salient location greater than a preset distance and with a largest average distance as the icon position if both the reference position and the salient location exist, wherein the average distance is an average of the distances between the candidate position and the reference position and the distance between the candidate position and the salient location.

Regarding the apparatus for determining an icon position 500 in the above embodiments, the specific manner in which each module performs the operations has been described in detail in the embodiment related to the method, and will not be illustrated in detail here.

Figure 6:
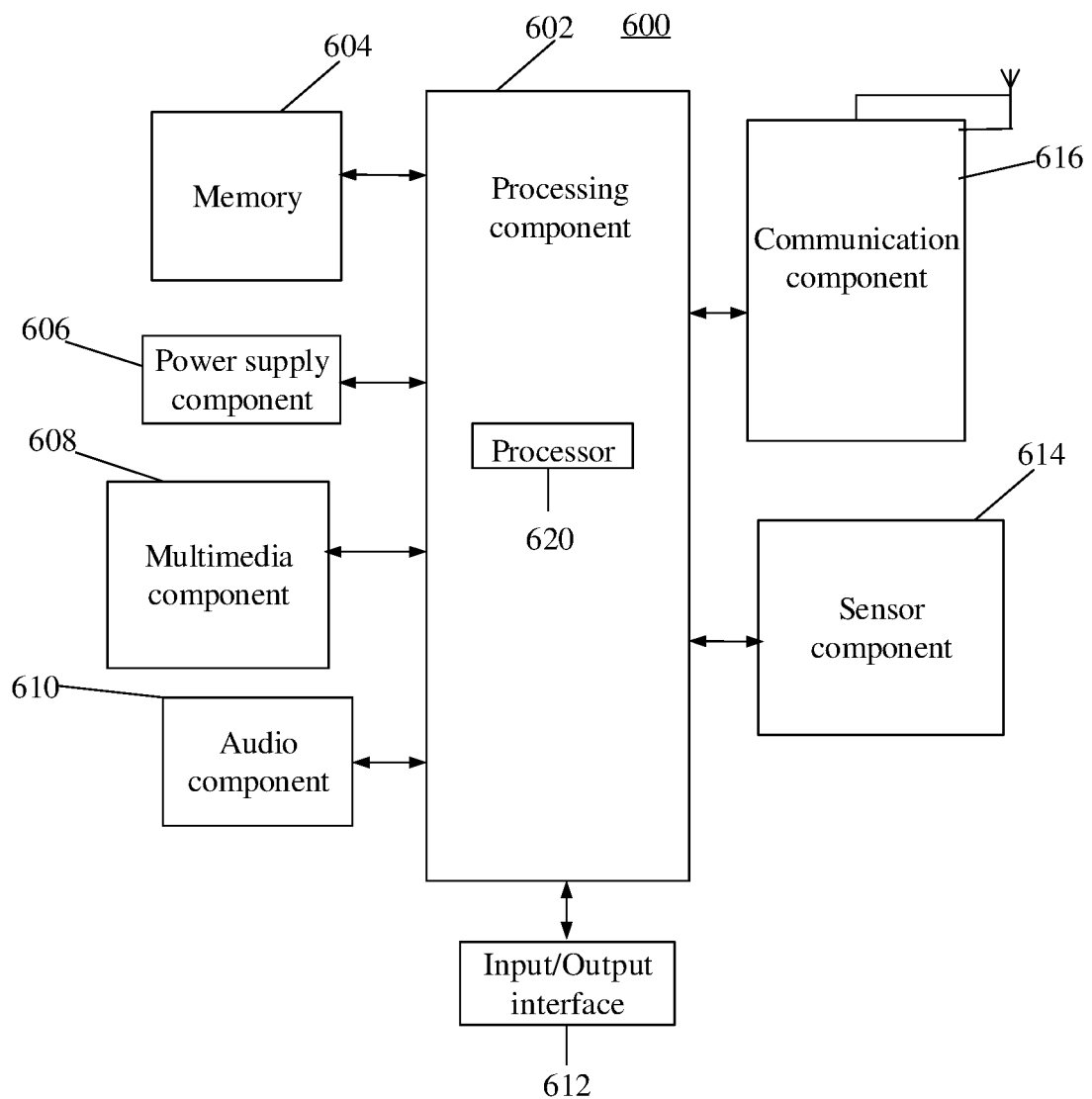
FIG. 6 illustrates a block diagram of an electronic device (a general structure of a mobile terminal) according to some embodiments.

FIG. 6 is a block diagram of an electronic device 600 for determining an icon position according to some embodiments. For example, the electronic device 600 may be a mobile phone, computer, digital broadcasting terminal, message transceiver, game console, tablet device, medical device, fitness device, personal digital assistant, or the like.

Referring to FIG. 6, the electronic device 600 may include one or more of a processing component 602, a memory 604, a power supply component 606, a multimedia component 608, an audio component 610, an Input/Output (I/O) interface 612, a sensor component 614, and a communication component 616.

The processing component 602 generally controls the overall operations of the electronic device 600, such as operations associated with display, phone call, data communication, camera operation, and recording operation. The processing component 602 may include one or more processors 620 for executing instructions to implement the following process:

detecting a target object in a target image and determining a reference position of the target object in the target image;

detecting a salient location in the target image;

selecting an icon position from preset candidate positions according to distances between the reference position or the salient location and the candidate positions.

Optionally, the processor 620 is specifically configured to:

obtain a grayscale image corresponding to the target image;

determine a salient area according to the grayscale information of different areas in the grayscale image;

obtain the salient location by determining a center of the salient area.

Optionally, the processor 620 is specifically configured to:

identify at least one object in the target image and a corresponding target area;

select a target object from the at least one object according to a preset rule;

take a target position of a target area corresponding to the target object as the reference position, wherein the target position comprises: a center of the target area corresponding to the target object, and a position of a target feature in the target area corresponding to the target object.

Optionally, the processor 620 is specifically configured to:

determine the target object according to a position/positions of the at least one object in the target image; or determine the target object according to an area proportion of the at least one object in the target image.

Optionally, the processor 620 is specifically configured to:

select a candidate position with a largest distance from the reference position as the icon position if the reference position exists but the salient location does not exist;

select a candidate position with a largest distance from the salient location as the icon position if the salient location exists but the reference position does not exist;

select a candidate position with both distances from the reference position and the salient location greater than a preset distance and with a largest average distance as the icon position if both the reference position and the salient location exist, wherein the average distance is an average of the distance between the candidate position and the reference position and the distance between the candidate position and the salient location.

In addition, the processing component 602 may include one or more modules to facilitate the interactions between the processing component 602 and other components. For example, the processing component 602 may include a multimedia module to facilitate the interactions between the multimedia component 608 and the processing component 602.

The memory 604 is configured to store various types of data to support the operations of the device 600. Examples of the data include instructions of any disclosure program or method, contact person data, phone book data, messages, pictures, videos and others operated on the electronic device 600. The memory 604 may be implemented by any type of volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

The power supply component 606 provides power for various components of the electronic device 600. The power supply component 606 may include a power management system, one or more power supplies, and other components associated with generating, managing and distributing the power for the electronic device 600.

The multimedia component 608 includes a screen of an output interface provided between the electronic device 600 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense the touching, the sliding, and the gestures on the touch panel. The touch sensor may not only sense the boundary of the touching or sliding operation, but also detect the duration and pressure related to the touching or sliding operation. In some embodiments, the multimedia component 608 includes a front camera and/or a rear camera. When the device 600 is in the operation mode such as shooting mode or video mode, the front camera and/or the rear camera may receive the external multimedia data. Each of the front camera and rear camera may be a fixed optical lens system or have the focal length and the optical zoom capability.

The audio component 610 is configured to output and/or input audio signals. For example, the audio component 610 includes a microphone (MIC). When the electronic device 600 is in the operation mode such as call mode, recording mode and voice recognition mode, the microphone is configured to receive the external audio signals. The received audio signals may be further stored in the memory 604 or transmitted via the communication component 616. In some embodiments, the audio component 610 further includes a speaker for outputting the audio signals.

The I/O interface 612 provides an interface between the processing component 602 and a peripheral interface module, where the above peripheral interface module may be a keyboard, a click wheel, buttons or the like. These buttons may include but not limited to: home button, volume button, start button, and lock button.

The sensor component 614 includes one or more sensors for providing the electronic device 600 with the state assessments in various aspects. For example, the sensor component 614 may detect the opening/closing state of the device 600, and the relative positioning of the components (for example, the display and keypad of the electronic device 600). The sensor component 614 may further detect the position change of the electronic device 600 or a component of the electronic device 600, the presence or absence of contact of the user with the electronic device 600, the orientation or acceleration/deceleration of the electronic device 600, and the temperature change of the electronic device 600. The sensor component 614 may include a proximity sensor configured to detect the presence of nearby objects with no physical contact. The sensor component 614 may further include a light sensor, such as CMOS or CCD image sensor, for use in the imaging disclosures. In some embodiments, the sensor component 614 may further include an acceleration sensor, a gyro sensor, a magnetic sensor, a pressure sensor, or a temperature sensor.

The communication component 616 is configured to facilitate the wired or wireless communications between the electronic device 600 and other devices. The electronic device 600 may access a wireless network based on a communication standard, such as WiFi, operator network (e.g., 2G, 3G, 4G or 6G), or a combination thereof. In an exemplary embodiment, the communication component 616 receives the broadcast signal or broadcast related information from an external broadcast management system via a broadcast channel. In an exemplary embodiment, the communication component 616 further includes a Near Field Communication (NFC) module to facilitate the short-range communications. For example, the NFC module may be implemented based on the Radio Frequency IDentification (RFID) technology, Infrared Data Association (IrDA) technology, Ultra-WideBand (UWB) technology, Bluetooth (BT) technology and other technologies.

In an exemplary embodiment, the electronic device 600 may be implemented by one or more Disclosure Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements to perform the above method.

In an exemplary embodiment, a non-transitory computer readable storage medium including instructions, for example, the memory 604 including instructions, is further provided, where the above instructions can be executed by the processor 620 of the electronic device 600 to complete the above method. For example, the non-transitory computer readable storage medium may be ROM, Random Access Memory (RAM), CD-ROM, magnetic tape, floppy disk, optical data storage device, or the like.

Figure 7:
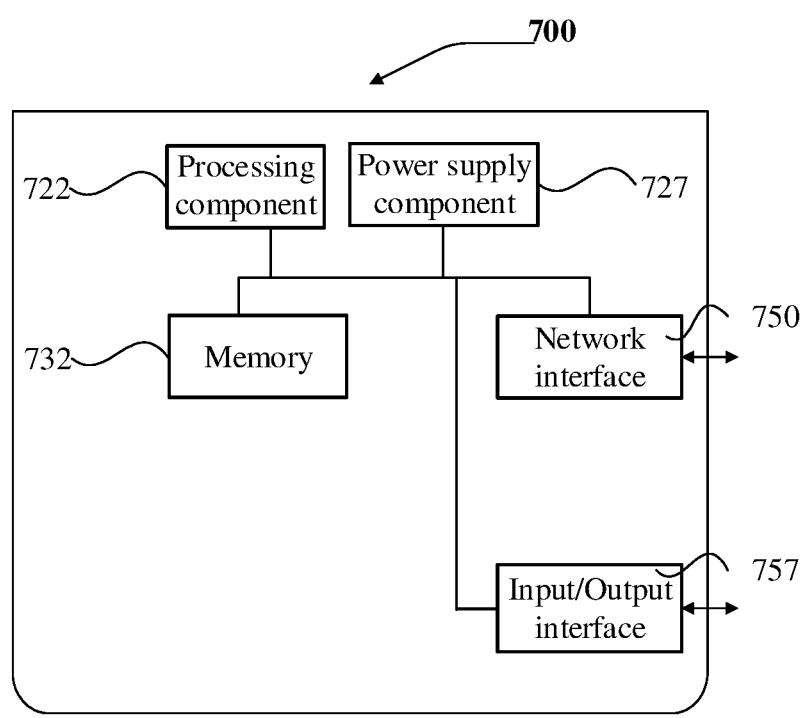
FIG. 7 illustrates a block diagram of an electronic device (a general structure of a server) according to some embodiments.

FIG. 7 is a block diagram of an electronic device 700 for determining an icon position according to some embodiments. For example, the electronic device 700 may be provided as a server. Referring to FIG. 7, the electronic device 700 includes a processing component 722 which further includes one or more processors, and the memory resource represented by a memory 732 for storing instructions (e.g., disclosures) that can be executed by the processing component 722. The disclosure stored in the memory 732 may include one or more modules, each of which corresponds to a set of instructions. In addition, the processing component 722 is configured to execute instructions to perform the audio playing method and the audio data sending method described above.

The electronic device 700 may further include: a power supply component 727 configured to perform the power management of the electronic device 700, a wired or wireless network interface 750 configured to connect the electronic device 700 to a network, and an Input/Output (I/O) interface 757. The electronic device 700 may operate based on an operating system stored in the memory 732, e.g., Windows Server™, Mac OS X™, Unix™, Linux™, FreeBSD™ or the like.

In an exemplary embodiment, a computer program product is further provided. The computer program product includes readable program codes that can be executed by the processing component 722 of the electronic device 700 to complete the above method. Optionally, the program codes may be stored in a storage medium of the electronic device 700, and the storage medium may be a non-transitory computer-readable storage medium. For example, the non-transitory computer-readable storage medium may be ROM, Random Access Memory (RAM), CD-ROM, magnetic tape, floppy disk, optical data storage device, or the like.

After considering the specification and practicing the invention disclosed here, those skilled in the art will readily come up with other embodiments of the disclosure. The disclosure is intended to encompass any variations, usages or applicability changes of the disclosure, and these variations, usages or applicability changes follow the general principle of the disclosure and include the common knowledge or customary technological means in the technical field which is not disclosed in the disclosure. The specification and embodiments are illustrative only, and the true scope and spirit of the disclosure is pointed out by the following claims.

It should be understood that the disclosure is not limited to the precise structures which have been described above and shown in the figures, and can be modified and changed without departing from the scope of the disclosure. The scope of the disclosure is only limited by the attached claims.

What is claimed is:

1. A method for determining an icon position, comprising:
    detecting a target object in a target image and determining a reference position of the target object in the target image;
    detecting a salient location in the target image; and
    selecting a candidate position with both distances from the reference position and the salient location greater than a preset distance threshold and with an average distance that is the largest average distance out of average distances for each candidate position of a plurality of preset candidate positions as the icon position in response to both the reference position and the salient location being detected, wherein the average distance is an average of a distance between the candidate position and the reference position and a distance between the candidate position and the salient location.

2. The method according to claim 1, wherein said detecting the salient location in the target image comprises:
    obtaining a grayscale image corresponding to the target image;
    determining a salient area according to grayscale information of different areas in the grayscale image; and
    obtaining the salient location by determining a center of the salient area.

3. The method according to claim 2, further, comprising:
    selecting a candidate position with a largest distance from the reference position as the icon position in response to the reference position being detected but the salient location not being detected; and
    selecting a candidate position with a largest distance from the salient location as the icon position in response to the salient location being detected but the reference position not being detected.

4. The method according to claim 1, wherein said detecting the target object in the target image and determining the reference position of the target object in the target image, comprises:
identifying at least one object in the target image and a corresponding target area;
selecting the target object from the at least one object according to a preset rule; and
taking a target position of a target area corresponding to the target object as the reference position, wherein the target position comprises: a center of the target area corresponding to the target object, and a position of a target feature in the target area corresponding to the target object.

5. The method according to claim 4, wherein said selecting the target object from the at least one object according to the preset rule, comprises:
selecting the target object according to a position of the at least one object in the target image; or
selecting the target object according to an area proportion of the at least one object in the target image.

6. The method according to claim 1, further comprising:
selecting a candidate position with a largest distance from the reference position as the icon position in response to the reference position being detected but the salient location not being detected; and
selecting a candidate position with a largest distance from the salient location as the icon position in response to the salient location being detected but the reference position not being detected.

7. An electronic device, comprising:
a processor; and
a memory for storing instructions executable by the processor;
wherein the processor is configured to execute the instructions to perform a method for determining an icon position comprising:
detecting a target object in a target image and determining a reference position of the target object in the target image;
detecting a salient location in the target image; and
selecting a candidate position with both distances from the reference position and the salient location greater than a preset distance threshold and with an average distance that is the largest average distance out of average distances for each candidate position of a plurality of preset candidate positions as the icon position in response to both the reference position and the salient location being detected, wherein the average distance is an average of a distance between the candidate position and the reference position and a distance between the candidate position and the salient location.

8. The electronic device according to claim 7, wherein said detecting the salient location in the target image comprises:
obtaining a grayscale image corresponding to the target image;
determining a salient area according to grayscale information of different areas in the gray scale image; and
obtaining the salient location by determining a center of the salient area.

9. The electronic device according to claim 8, wherein the processor is configured to execute the instructions to further perform:

selecting a candidate position with a largest distance from the reference position as the icon position in response to the reference position being detected but the salient location not being detected; and
selecting a candidate position with a largest distance from the salient location as the icon position in response to the salient location being detected but the reference position not being detected.

10. The electronic device according to claim 7, wherein said detecting the target object in the target image and determining the reference position of the target object in the target image, comprises:
identifying at least one object included in the target image and a corresponding target area;
selecting the target object from the at least one object according to a preset rule; and
taking a target position of a target area corresponding to the target object as the reference position, wherein the target position comprises: a center of the target area corresponding to the target object, and a position of a target feature in the target area corresponding to the target object.

11. The electronic device according to claim 10, wherein said selecting the target object from the at least one object according to the preset rule, comprises:
selecting the target object according to a position of the at least one object in the target image; or
selecting the target object according to an area proportion of the at least one object in the target image.

12. The electronic device according to claim 7, wherein the processor is configured to execute the instructions to further perform:
selecting a candidate position with a largest distance from the reference position as the icon position in response to the reference position being detected but the salient location not being detected; and
selecting a candidate position with a largest distance from the salient location as the icon position in response to the salient location being detected but the reference position not being detected.

13. A non-transitory readable storage medium, wherein instructions in the storage medium, when executed by a processor of an electronic device, enable the electronic device to perform a method for determining an icon position, wherein the method comprises:
detecting a target object in a target image and determining a reference position of the target object in the target image;
detecting a salient location in the target image; and
selecting a candidate position with both distances from the reference position and the salient location greater than a preset distance threshold and with an average distance that is the largest average distance out of average distances for each candidate position of a plurality of preset candidate positions as the icon position in response to both the reference position and the salient location being detected, wherein the average distance is an average of a distance between the candidate position and the reference position and a distance between the candidate position and the salient location.

14. The non-transitory readable storage medium according to claim 13, wherein said detecting the salient location in the target image comprises:
obtaining a grayscale image corresponding to the target image;

determining a salient area according to grayscale information of different areas in the grayscale image; and obtaining the salient location by determining a center of the salient area.

15. The non-transitory readable storage medium according to claim 14, wherein the instructions in the storage medium, when executed by the processor of the electronic device, enable the electronic device to further perform:

selecting a candidate position with a largest distance from the reference position as the icon position in response to the reference position being detected but the salient location not being detected; and selecting a candidate position with a largest distance from the salient location as the icon position in response to the salient location being detected but the reference position not being detected.

16. The non-transitory readable storage medium according to claim 13, wherein said detecting the target object in the target image and determining the reference position of the target object in the target image, comprises:

identifying at least one object in the target image and a corresponding target area;

selecting the target object from the at least one object according to a preset rule; and taking a target position of a target area corresponding to the target object as the reference position, wherein the target position comprises: a center of the target area corresponding to the target object, and a position of a target feature in the target area corresponding to the target object.

17. The non-transitory readable storage medium according to claim 16, wherein said selecting the target object from the at least one object according to the preset rule, comprises:

selecting the target object according to a position of the at least one object in the target image; or selecting the target object according to an area proportion of the at least one object in the target image.

18. The non-transitory readable storage medium according to claim 13, wherein the instructions in the storage medium, when executed by the processor of the electronic device, enable the electronic device to further perform selecting a candidate position with a largest distance from the reference position as the icon position in response to the reference position being detected but the salient location not being detected; and selecting a candidate position with a largest distance from the salient location as the icon position in response to the salient location being detected but the reference position not being detected.

* * * * *